United States Patent [19]
Wood

[11] 3,897,585
[45] July 29, 1975

[54] INTEGRAL REINFORCED STRUCTURES WITH A POLYUREA ADHESIVE COMPONENT

[75] Inventor: Louis L. Wood, Potomac, Md.

[73] Assignee: W. R. Grace & Co., New York, N.Y.

[22] Filed: Aug. 28, 1972

[21] Appl. No.: 284,023

Related U.S. Application Data

[63] Continuation-in-part of Ser. No. 252,793, May 12, 1972.

[52] U.S. Cl. . 428/395; 260/29.2 TN; 260/77.5 CH; 156/110 A; 156/124; 156/331; 428/424
[51] Int. Cl.² ......................................... C08G 71/02
[58] Field of Search...260/77.5 CH, 29.2 TN, 32.8 N; 161/190, 169, 170; 156/110 A, 124, 128 U

[56] References Cited
UNITED STATES PATENTS

| 2,721,811 | 10/1955 | Dacey et al. ................... 156/110 A |
| 2,852,494 | 9/1958 | Lehmann et al. ............ 260/77.5 CH |
| 2,953,489 | 9/1960 | Young .............................. 156/110 A |
| 3,044,898 | 7/1962 | Habib .............................. 260/29.2 TN |
| 3,388,087 | 6/1968 | Dieterich et al. ............. 260/29.2 TN |
| 3,607,837 | 9/1971 | Reegen et al. ................ 260/29.2 TN |
| 3,682,867 | 8/1972 | Shackelford et al. ........ 260/77.5 CH |
| 3,796,678 | 3/1974 | Bartizal ......................... 260/29.2 TN |

FOREIGN PATENTS OR APPLICATIONS 43-26511  11/1968  Japan

Primary Examiner—George F. Lesmes
Assistant Examiner—R. J. Roche
Attorney, Agent, or Firm—Eugene M. Bond

[57] ABSTRACT

The invention disclosed is for integral reinforced structures of elastomeric materials using the "a" gas composition derived from particular polyisocyanates and polyamines. The polyureas composition is effective in combining the reinforcing assemblies with the elastomeric materials into an integral unit.

6 Claims, No Drawings

INTEGRAL REINFORCED STRUCTURES WITH A POLYUREA ADHESIVE COMPONENT

This application for U.S. Letters Patent is a continuation-in-part of application of Ser. No. 252,793, filed May 12, 1972.

This invention relates to integral structures of elastomeric materials and reinforcement assemblies of filaments and/or cords using a defined polyureas composition. More particularly, the present invention provides a new improved method for bonding reinforcement assemblies of filaments and/or cords to elastomeric structures using a polyureas composition derived from polyisocyanates and polyamines.

Use of fibers, and filaments including generally strands, cords, ropings and the like into an elastomeric matrix is well known. Many structures are prepared using these reinforcing techniques, including tires, hoses, belts, gaskets and the like.

The use of reinforcement materials in elastomeric compositions requires generally use of an adhesive or bonding agent. Each of the known reinforcement structures has its own particular advantage dependent to a degree upon the inherent properties of the basic filament or the type of elastomer used. The particular advantage is dependent to a degree upon the inherent properties of the basic filament as well as, to a degree, upon the successful translation of that property into ultimate performance when embodied in an elastomeric matrix. The properties of glass, for example, considered qualitatively, include relative imperviousness to moisture, high modulus, low percent elongation, high dimensional stability and relative inertness to temperature. However, the translation of those desirable properties into a vulcanized or cured rubber product has proven to be very difficult of attainment due to the character of the glass fiber. Whereas textile fibers have a degree of surface porosity and/or surface projecting hairlike tendrils, for example, which provide mechanical securement to the rubber matrix, glass fibers, on the other hand, are perfectly smooth.

When cotton fiber has been used as a reinforcement structure, because of its numerous fiber ends, good mechanical bonding was realized without need for adhesive. Rayon on the other hand requires a resorcinol/formaldehyde/styrene-butadiene latex (RFL) adhesive whereas with polyamides, i.e., nylon, the styrene-butadiene latex had to be modified by adding vinyl pyridine as a termonomer in order to achieve satisfactory adhesion and bonding.

A number of means are available for adhesion of polyester cord, e.g., Dacron; and metal cord, i.e., steel in elastomeric systems. In polyester reinforced systems, for example, most of the proposed methods require an aqueous double-dip, the first dip being an aqueous dispersion of epoxy resin and a blocked isocyanate with the second dip being a standard resorcinol/formaldehyde/latex combination used for polyamides.

Several different theories have been advanced for the mechanism of cord-elastomer adhesion. Generally, these theories are based on formation of covalent bonds between the adhesivecord and the adhesive-elastomer. Another theory is that the adhesive serves to bridge between the high modulus cord and the low modulus elastomer. In brassed steel cords, the formation of a bond between rubber and the brass coating of the steel cord is believed to be due to sulfur linkages between the vulcanizate and the copper in the coating. Additives to the system can influence the strength of the adhesive bond.

Desirably, cord-elastomer adhesives are water-base coatings which uniformly adhere to the cord when dipped. Also, the adhesive coating should penetrate between the twists of the cores. Adhesives derived from modified polyisocyanates are especially good adhesives for bonding to many different substrates.

It is also known in the prior art that attempts to prepare ureas by reaction of isocyanates with simple amines proceeds rapidly and energetically and that application in polymerization reactions, i.e., reactions of polyisocyanates with polyamines generally, does not result in desirable soluble thermoplastics. Instead, various complex branched, crosslinked, non-soluble, non-thermoplastic gels typically form during the reaction. It since has been found, however, that by practice of the invention of Ser. No. 252,793, incorporated herein by reference, reactions of polyisocyanates with polyamines are possible when moderated by, for example, a non-protonic, i.e., having no active protons, carbonyl containing solvent such as a ketone or aldehyde solvent.

Generally stated, the present invention provides new improved polyureas adhesive component prepared by reacting polyisocyanates with polyamines in a reaction moderating solvent. The resultant reactant mixture of non-crosslinked pulyureas may then be disposed onto a filament or cord as desired with final curing, i.e., by use of a crosslinking agent; by application of external energy such as heat, oxidative environments and the like; and accompanied by removal of the reaction moderating solvent. The cured crosslinked polyureas are characteristically tough, abrasion resistant resins having excellent utility in bonding various cords to elastomeric materials.

Recognizing that the present reaction mechanism may be subject to speculation, it appears that the present reaction proceeds because the moderating solvent such as ketone or aldehyde solvents form complexes or weakly bonded components with polyamines thus slowing down what otherwise would be an instantaneous reaction with isocyanates. The mechanism thus appears as follows:

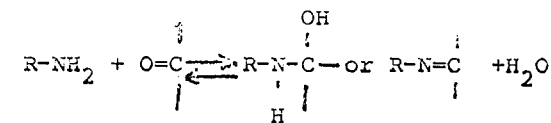

The interaction of the moderating solvent is easily reversed and any amine groups which have not reacted with isocyanates are readily available for subsequent and more highly desirable reactions.

Polyamines, such as diethylene triamine, may be reacted with from equal molar amounts to large excesses of a moderating solvent such as ketone or aldehyde solvents. Examples of these solvents include acetone, methyl ethyl ketone, cyclohexanone, acetaldehyde, propionaldehyde, butyraldehyde, isobutyraldehyde and the like. The reaction preferably may be effected for times ranging from about 2 minutes to about 24 hours, i.e., aging at a temperature of about −5° to about 150°C. To the resultant solution then maintained at a temperature of about 0° to about 25°C. is added a cold solution of polyisocyanate at a temperature in the range of about 0° to about 25°C. disposed in a similar solvent. The molar ratio of amine groups to isocyanate groups is from about 1:1 or larger amounts to about 1:20 of amine groups as desired. Usually, it is desirable to include an excess of polyamine over the isocyanate such that the resultant polyureas contain free amino groups available for many supplemental reactions.

After stirring the reactants at about 0° to about 100°C. for about 2 minutes to about 8 hours, polymerization is complete and the resultant solution or slurry of essentially non-crosslinked polyureas is ready for subsequent fabrication, curing or applications as desired.

A broad spectrum of useful filamentous product-elastomeric adhesive applications are possible for the present polyureas containing available amino groups. These applications are based on the ability of the present polyureas to form crosslinkable stable polymer solutions, which, after proper formulation, and upon drying, i.e., removal of the solvent, cure by crosslinking to give tough insoluble adhesive resins useful for filaments, yarns, threads, fabrics and cords to elastomeric materials.

Of special and significant commercial importance are those polyurea products which are soluble or dispersible in aqueous media. For example, these systems are useful for polyurea-amine adducts involving epichlorohydrin or formaldehyde as follows:

2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,3'-dimethyl-4, 4'-biphenylene diisocyanate, 3,3'-dimethoxy-4, 4'-biphenylene diisocyanate, 2,2', 5,5'-tetramethyl-4, 4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as described. The aromatic diisocyanates and polyisocyanates or mixtures thereof which are especially suitable are those which are readily commercially available, have a high degree of reactivity and a relatively low cost. Also, polymeric polyisocyanates are especially useful in the practice of this invention, such as illustrated subsequently.

Examples of polyamines useful herein include, without limitation, molecules having two or more amine members, including hydrazine. These amine members may be ordinarily attached to either aliphatic or aromatic molecules. Typically, the polyamines are those molecules having from about 2 to about 23 pendant amines. Specific examples of polyamines include but are not limited to materials such as diethylenetriamine, triethylene-tetramine, tetraethylenepentamine, polyethyleneimine, tolylene-2,4,6-triamine, ethylene diamine, N,N'-dimethylethylene diamine, trime-

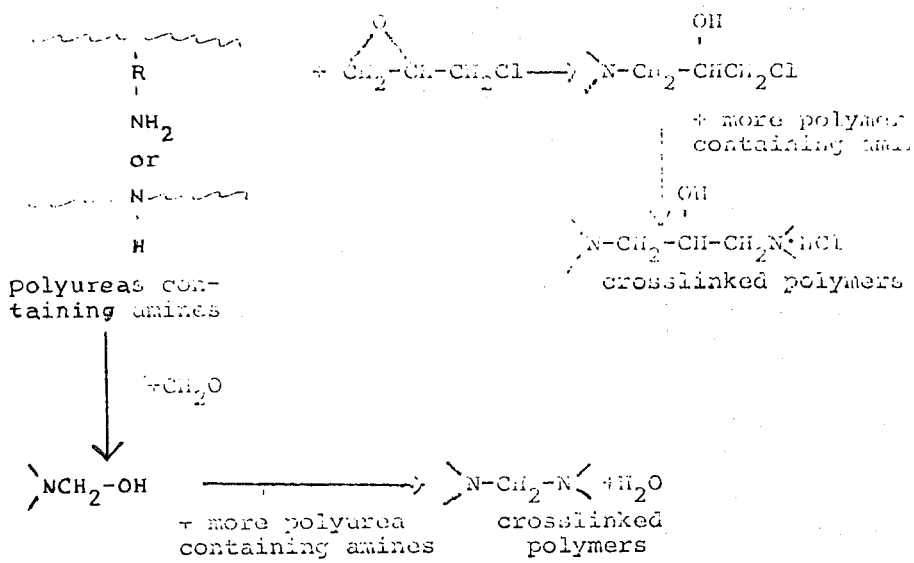

These adducts may be formed in generally two steps. First, the epichlorohydrin or formaldehyde may be attached to a single amino group in the polyurea chain at pH below 8.0 and/or dilute solutions in water or carbonyl containing solvents, with little or no crosslinking. Upon adjusting the pH above 8 and/or removing the solvent, a second crosslinking step takes place resulting in a tough, insoluble resin.

Examples of monomeric polyisocyanates useful herein include polyisocyanates and polyisothiocyanates such as a polyaryl polyisocyanate as defined in U.S. Pat. No. 2,683,730 tolylene diisocyanate, triphenylmethane-4,4'4'',-triisocyanate, benzene-1,3,5-triisocyanate, toluene-2,4,6-triisocyanate, diphenylthylenediamine, tetramethylenediamine, pentamethylenediamine, hexamethylenediamine, and the like. Other suitable polyamines include propylene diamine, dipropylene triamine, 1,3 diamino butane and the like. They are considered as members of the broad class of alkylene polyamines. Ordinarily the word "polyamine" is employed to include diamines, as well as amines having three or more nitrogens.

The adhesive systems of the present invention are particularly useful as bonding agents for non-woven and woven natural or synthetic fibers and fabrics; cords, yarns, strands, ropes, filaments and the like; plastics, metals, and glasses; as crosslinking agents for various other resins including epoxy resins, isocyanated, carboxylated, and halogenated polymers; and as functional additives to conventional cord-elastomeric adhesives such as especially those used for tire cords presently. Tire elastomers of particular merit are those comprising styrene/butadiene copolymers, polybutadiene, polyisoprene, natural rubber, ethylene/propylene copolymers, and ethylene/propylene/non-conjugated diene multipolymers.

In bonding polyester tire cord to rubber, the aqueous polyureas adhesives of this invention can be used either in in a one-step dip, i.e., the polyureas adhesive is added to the RFL or modified RFL formulation prior to treatment of the cords, or by a two-step dip in which the polyureas adhesive is used in a first dip which acts as a tie coat for a second conventional RFL dip.

The following examples will aid in explaining, but should not be deemed as limiting, practice of the present invention.

EXAMPLE 1

SBR (styrene-butadiene-rubber) was compounded according to ASTM D15-59T for sample preparation for physical testing of rubber products using the following recipe:

| Ingredients | Parts by Weight |
|---|---|
| SBR 1502 (General Tire & Rubber Co.) | 100 |
| Zinc Oxide | 5 |
| Sulfur | 1.5 |
| MBTS (Altax by R. T. Banderbilt Co.) | 1.75 |
| EPC Black (Spheron 9 by Cabot Corp.) | 40 |

The prepared rubber was sheeted on a two-roll mill and stored at 0°C. to prevent premature vulcanization.

EXAMPLE 2

EPDM (Ethylene-propylene-diene monomer) rubber was compounded according to the procedure outlined in DuPont booklet, Nordel, April 1964, p. 8, using the following recipe:

| Ingredients | Parts by Weight |
|---|---|
| EPDM (Nordel 1070 by DuPont) | 100 |
| HAF Black (Vulcan by Cabot Corp.) | 80 |
| Zinc Oxide | 5 |
| Process Oil (Shellflex 411 by Shell) | 40 |
| Tetramethylthiuram disulfide | 0.75 |
| Mercaptobenzothiazole (MBT) | 1.5 |
| Sulfur | 2 |
| Dipentamethylenethiuram tetrasulfide | 0.75 |

Again, the prepared rubber was sheeted on a two-roll mill and stored at 0°C. to prevent premature vulcanization.

EXAMPLE 3

RFL adhesives were prepared generally according to Moult, Bonding Textiles to Rubber, Chap. 42, Handbook of Adhesives, Reinhold Pub. Co., 1962, using the following:

I. Resorcinol-formaldehyde solution (F:R mole ratio = 2.5):

| | % active | g active | g total |
|---|---|---|---|
| Resorcinol | 100 | 21.5 | 21.5 |
| Formaldehyde | 36.9 | 14.6 | 39.6 |
| NaOH, 10% W/W | 10.0 | 1.3 | 13.0 |
| Water, distilled | — | — | 299.9 |
| | 10.0 | 37.4 | 374.0 |

The NaOH, resorcinol, and formaldehyde were added in that order to the water with stirring. The solution was stirred for 4 hours with cooling to keep the temperature at 15°–25°C.

II. RFL adhesive:

| | % active | g active | g total |
|---|---|---|---|
| Latex | $t$ | 143.0 | (143) (100/$t$) |
| Water, distilled | — | — | 626–(143) (100/$t$) |
| RF solution (I) | 10.0 | 37.4 | 374 |
| | 18.0 | 180.4 | 1000 |

The latex $t$ containing 8% solids was added to the water with stirring. This diluted latex was added to the RF solution (I) with stirring, and the mixture allowed to age overnight before use. Generally, the RFL adhesives were then used within 3 days.

Additives to the RFL were generally added after aging, and water content was adjusted to keep the overall concentration at 18%.

EXAMPLE 4

1000 grams polyoxyethylene glycol having a weight average molecular weight of 1000 was outgassed by stirring at 110°C. for about 3–5 hours. The remaining glycol having a weight of about 980 grams was cooled to 50°C. and then added as a liquid over a period of 15–20 minutes under an inert nitrogen atmosphere, to 325 grams of tolylene diisocyanate. The tolylene diisocyanate had 80% by weight of the 2,4 isomer, and 20% by weight of the 2,6 isomer. The reaction temperature was maintained between about 50°C. and 60°C. with stirring continuing for 3–5 hours. Isocyanate capped polyoxyethylene glycol was recovered from this reaction.

EXAMPLE 5

A solution of 103 grams of diethylene triamine in 500 ml dry acetone was stirred at 60°–65°C. under a dry nitrogen atmosphere for 2 hours. The resultant solution was cooled to 5° to 10°C. Next, 980 grams of the isocyanate capped polyoxyethylene glycol prepared in Example 4 in 1000 ml dry acetone at 50°–10°C. was added, with good stirring. The resultant clear, pale yellow solution was stirred at 10°–15°C. for 2 hours. The product solution was next warmed to 60°–70°C., and approximately three-fourths of the acetone representing about 1100 ml was removed by distilling the solution. To keep the product fluid, 1000 ml water was added and most of the remaining acetone representing about 300–400 ml was distilled at less than 80°C. The remaining yellow product syrup was diluted to 20% solids content by adding 4400 ml water. A non-crosslinked amino-containing polyurea polymer in solution having a pH 9.5 was recovered.

EXAMPLE 6

5400 grams of the aqueous polyurea polyamine polymer solution recovered in Example 5 was warmed to 60°C. 555 grams of epichlorohydrin were added to the aqueous prepolymer solution over a period of about 5 minutes with good stirring. The resultant solution was stirred at 60°C. for about 1–4 hours until the Brookfield viscosity at 25° reached 500–600 cps. A turbid tan colored product resulted which was then diluted with 12,400 ml cold water. The diluted product solution was cooled to 25°C. after which the pH was adjusted to 5.5 using dilute aqueous hydrochloric acid.

Although the present polyureas composition generally is applied to the cord by dipping, it may also be applied during spin finishing, weaving or twisting operations.

In processing metal cords, it is useful to first shot blast the cord, clean the blasted cord with a suitable solvent especially for grease or oil removal, and thereafter apply the adhesive. A useful metal cord is brassed steel (1 × 3 + 5 × 7 + 1) × 0.0059 kn, with a brass coating of 70/30 copper/zinc ratio.

EXAMPLE 7

Polyester tire cord (1260/2) was stretched across an aluminum frame and dipped in 1000 ml. of the product solution from Example 6. The sample was then dried at 110°C. for 20 minutes and dipped in the RFL preparation of Example 3. After drying again at 110°C. for 20 minutes, the sample was imbedded with SBR rubber compound of Example 1 on a one-fourth inch H-test frame (ASTMD 2138-67). The sample was then cured for 30 minutes at 150°C. The cord pullout strength at 23°C. was 19 pounds. By contrast, when the RFL was used alone, the pullout value was 11 pounds.

EXAMPLE 8

Example 7 was repeated except that the product solution (500 ml.) from Example 6 was admixed with RFL adhesive (1000 ml.) from Example 3 prior to dipping of the polyester cord. After dipping, drying, imbedding and curing, the cord pullout strength was measured and found to be greater than 15 pounds.

EXAMPLE 9

The procedures of Examples 7 and 8 were repeated except using as the tire cord, both polyamide (nylon 6.6) and Fiber B, a trademarked product by du Pont de Nemours for a modified polyamide tire cord. Comparable results were realized. Also, it was noted that placements of the tire cord in bias, radial, or bias belted configurations resulted in good adhesion indicating that the particular configurations were not critical for adhesion using the present compositions.

EXAMPLE 10

Melt-spun steel fiber tire cord was stretched across an aluminum frame and dipped in 1000 grams of product solution used in Example 6. The dipped product was dried at 130°C. for 10 minutes after which it was dipped into styrene-budiene-vinyl pyridine latex having about 20% solids. The product was next dried, and then embedded with EPDM rubber compound from Example 2 on a one-fourth inch H-test frame using the general procedure ASTMD 2138-67. The sample was cured for about 20 minutes at about 160°C. Cord pullout strength at 23°C. was found to be greater than 15 pounds. Similar results were realized using rayon fiber cord in place of the steel cord of this example.

What is claimed is:

1. In combination, a reinforcement assembly, an elastomeric structure, and an adhesive, said adhesive consisting in the uncured state essentially of a non-crosslinked polyurea prepared by reacting a first component comprising polyisocyanate selected from the group consisting of tolylene diisocyanate, triphenylmethane-4,4'4'',-triisocyanate, benzene-1,3,5-triisocyanate, toluene-2,4,6-triisocyanate, diphenyl-2,4,4'-triisocyanate, hexamethylene diisocyanate, xylylene diisocyanate, chlorophenylene diisocyanate, xylylene diisocyanate, chlorophenylene diisocyanate, diphenylmethane-4,4'-diisocyanate, naphthalene-1,5-diisocyanate, xylene-alpha, alpha'-diisothiocyanate, 3,3'-dimethyl-4,4'-biphenylene diisocyanate, 3,3'-dimethoxy-4,4'biphenylene diisocyanate, 2,2',5'5'-tetramethyl-4,4'-biphenylene diisocyanate, 4,4'-methylenebis (phenylisocyanate)c4,4'-sulfonylbis (phenylisocyanate),4,4'-methylene di-orthotolylisocyanate, ethylene diisocyanate, ethylene diisothiocyanate, trimethylenediisocyanate; and a second component comprising alkylene polyamine having from about 2 to about 23 pendant amine groups in a non-protonic carbonyl containing solvent selected from the group consisting of acetone, methyl ethyl ketone, cyclohexanone, acetaldehyde, propionaldehyde, butyraldehyde, and isocbutyraldehyde; said polyamine and said solvent being first combined for from about 2 minutes to about 24 hours at a temperature of about −5° to about 150°C.; the molar ratio of isocyanate groups in the polyisocyanate to amine groups in the polyamine being from about 1:1 to about 1:20 isocyanate to amine; said adhesive being cured by addition of water and removal of the solvent from the non-crosslinked polyurea.

2. The combination of claim 1 wherein the reinforcement assembly is glass cord.

3. The combination of claim 1 wherein the reinforcement assembly is steel cord.

4. The combination of claim 1 wherein the reinforcement assemble is rayon cord.

5. The combination of claim 1 wherein the reinforcement assembly is polyester cord.

6. The combination of claim 1 wherein the reinforcement assembly is polyamide cord.

* * * * *